(No Model.)
S. TOOMEY.
SULKY.
No. 522,631. Patented July 10, 1894.
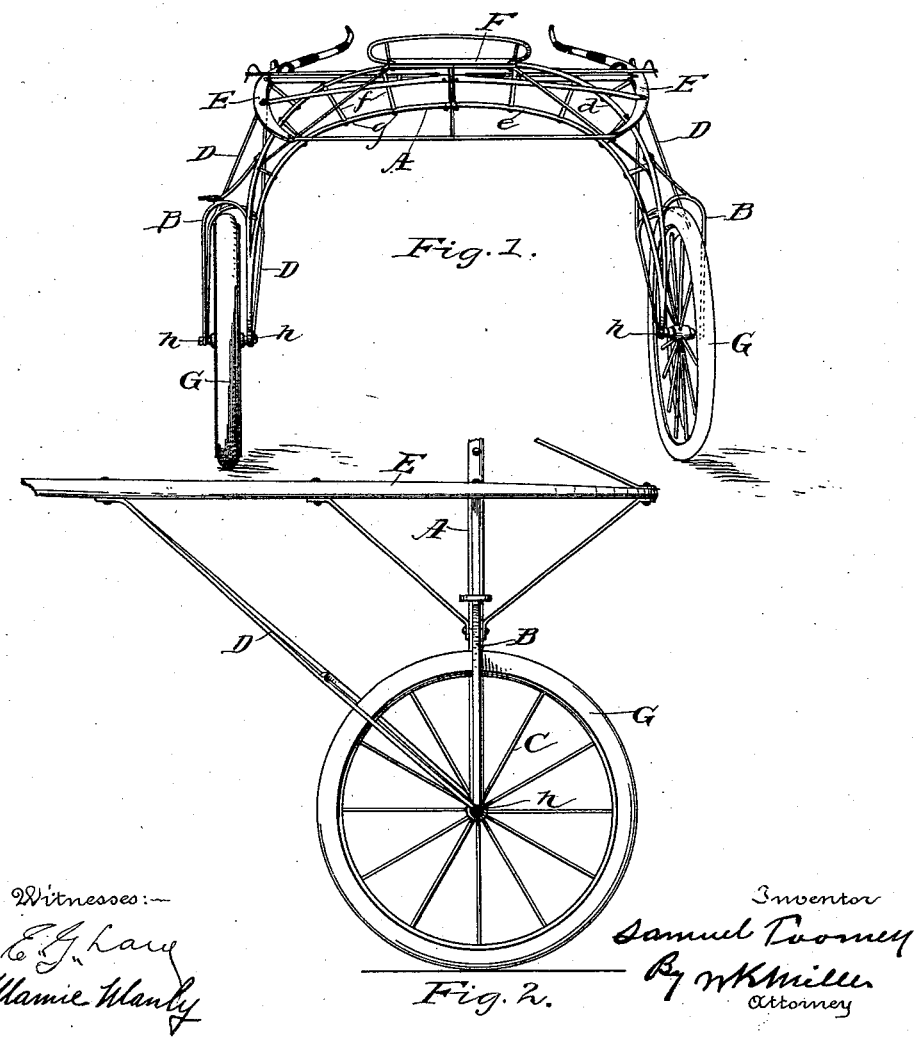

UNITED STATES PATENT OFFICE.

SAMUEL TOOMEY, OF CANAL DOVER, OHIO.

SULKY.

SPECIFICATION forming part of Letters Patent No. 522,631, dated July 10, 1894.

Application filed March 7, 1893. Serial No. 464,971. (No model.)

*To all whom it may concern:*

Be it known that I, SAMUEL TOOMEY, a citizen of the United States, and a resident of Canal Dover, county of Tuscarawas, State of Ohio, have invented a new and useful Improvement in Sulkies, of which the following is a full, clear, and exact description, reference being had to the accompanying drawings, making part of this specification.

My invention relates to improvements in sulkies for speeding horses the object of which is to provide a sulky adapted for the use of wheels having inflated or yielding tires, and for supporting the wheel spindles in alignment.

With these objects in view my invention consists of certain features of construction and combination of parts as will be hereinafter described and pointed out in the claim.

Figure 1, of the accompanying drawings is a view from the rear, partly perspective. Fig. 2, is a side view showing the side of the wheels, the draft cord and other detail.

In adapting the gear of a sulky of this class to the use of low wheels, rigidity and strength in the parts reaching down to the wheel spindle are of the utmost importance.

Referring to Fig. 1, of the drawings, A represents the axle composed of two parts or members $d$ $e$, bent to any desired curvature, placed one within the other and spaced apart and secured in such relation throughout the central arched or curved portion by the spools $f$ and bolts $g$ or similar devices. The end portions of members $d$ $e$, are secured to the inner end portion of the wheel spindle $h$, thus forming a bowed or arched axle extending continuously from the inner end of one spindle to the inner end of the other.

To support the outer end of the spindle, $h$, a support as B is secured to the axle at a point or points above the wheel and projected over and down on the outside of wheel to the outer end of the spindle. To hold the spindle in alignment a draft cord or brace D is provided the rear end portions being secured to the ends of the spindle, the front end to the shafts E at a point in advance of the axle, or if preferred, the rear end portions of the cord may be attached to the axle A, and support B, at a point above the wheel spindle.

It is immaterial what form of spindle or what form of wheel hub is used, for the purpose of this application, I have shown a wheel C, less in diameter than the distance between the shafts and the ground, and having wooden hub and spokes, but other hubs and spokes may be used. I have also shown and prefer an inflated tire as G, but other forms of yielding tire may be used.

The shafts E and seat F may be secured to the axle as shown or by any of the well known and approved plans.

Having thus fully described the nature and object of my invention, what I claim, and desire to secure by Letters Patent, is—

In a sulky, the combination with the shafts and the wheels, of the axle composed of two arched members the end portions secured to and extending continuously from the inner end of one spindle to the inner end of the other and the central portion being spaced apart and arched above the wheels, and supports secured to the outer ends of said spindles and extending upward parallel with the side of the wheel and bent over the top of the wheel and secured to the axle at points above the spindles, and rods connecting the shafts with the spindles, substantially as herein described.

In testimony whereof I have hereunto set my hand this 4th day of March, A. D. 1893.

SAMUEL TOOMEY.

Witnesses:
JOSEPH H. HOSTETTER,
BURT. W. MILLER.